United States Patent [19]
Schafer et al.

[11] Patent Number: 5,667,252
[45] Date of Patent: Sep. 16, 1997

[54] INTERNAL SLEEVE WITH A PLURALITY OF LANDS AND TEETH

[75] Inventors: Bruce William Schafer; Mark Aaron Sloman; Stanley Mark Gryder, all of Lynchburg; Randal Ray Schaefer, Forest, all of Va.

[73] Assignee: Framatome Technologies, Inc., Lynchburg, Va.

[21] Appl. No.: 414,797

[22] Filed: Mar. 31, 1995

Related U.S. Application Data

[63] Continuation-in-part of Ser. No. 305,251, Sep. 13, 1994.

[51] Int. Cl.⁶ .................................................... F16L 13/14
[52] U.S. Cl. ........................... 285/15; 29/507; 29/523; 285/259; 285/382.4; 285/397
[58] Field of Search .......................... 285/15, 382.4, 285/382.5, 370, 397, 259, 328, 382; 29/507, 523

[56] References Cited

U.S. PATENT DOCUMENTS

| | | | |
|---|---|---|---|
| 2,092,358 | 9/1937 | Robertson | 285/382.4 |
| 2,183,563 | 12/1939 | Hart | 285/382.4 |
| 2,268,142 | 2/1941 | Lusner et al. | 285/382.5 |
| 2,517,606 | 8/1950 | Spender | 285/258 |
| 3,017,203 | 1/1962 | Macleod | 285/259 |
| 3,467,180 | 9/1969 | Pensotti | 29/507 |
| 4,159,564 | 7/1979 | Cooper, Jr. | 29/727 |
| 4,330,142 | 5/1982 | Paini | 285/259 |
| 4,513,497 | 4/1985 | Finch | 29/727 |
| 4,581,801 | 4/1986 | Kobuck et al. | 285/382.4 |
| 4,616,392 | 10/1986 | Snyder | 29/283.5 |
| 4,663,119 | 5/1987 | Kerrey | 29/523 |
| 4,713,870 | 12/1987 | Szalvay | 29/507 |
| 4,724,595 | 2/1988 | Snyder | 29/283.5 |
| 4,724,693 | 2/1988 | Tedder | 72/58 |
| 4,819,315 | 4/1989 | Cartry et al. | 285/382.4 |
| 5,009,002 | 4/1991 | Kelly | 29/890 |
| 5,190,323 | 3/1993 | Oetiker | 285/258 |
| 5,242,199 | 9/1993 | Hann et al. | 285/259 |

FOREIGN PATENT DOCUMENTS

| | | | |
|---|---|---|---|
| 6207692 | 7/1994 | Japan | 285/382.4 |

*Primary Examiner*—Eric K. Nicholson
*Attorney, Agent, or Firm*—Rhodes Coats & Bennett, L.L.P.

[57] ABSTRACT

A repair sleeve for installation in a parent tube by a sleeve expander of the type operable between an expanded state and an unexpanded state. The sleeve includes an elongated sleeve member having an outer wall and a bore sized and configured to receive the sleeve expander when the sleeve expander is in the unexpanded state. An engagement structure extends radially outward from the outer wall of the sleeve member for engagement with the interior surface of the parent tube. The engagement structure includes a plurality of circumferential teeth located along the outer wall of the sleeve member and at both ends of the sleeve member which are inclined to each other with respect to each of the ends. A plurality of peripheral lands are formed on the outer wall of the sleeve member, wherein the plurality of teeth are disposed between at least two of the peripheral lands located at each end of the sleeve.

31 Claims, 5 Drawing Sheets

FIG. 3
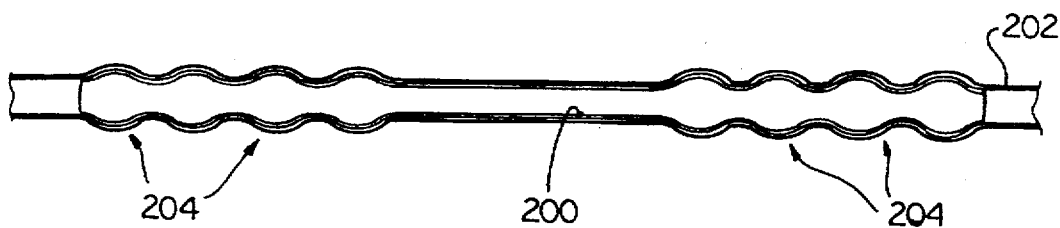
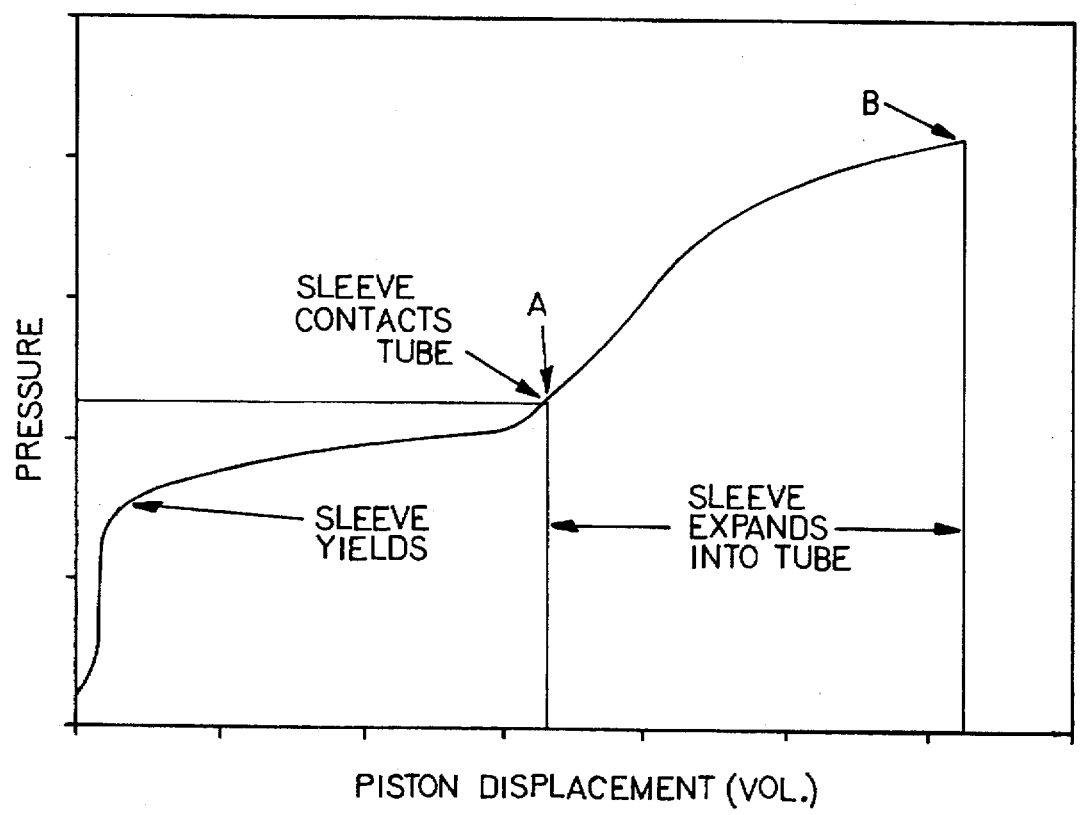
FIG. 4

INTERNAL SLEEVE WITH A PLURALITY OF LANDS AND TEETH

The present application is a continuation-in-part application of U.S. patent application Ser. No. 08/305,251, filed Sep. 13, 1994.

BACKGROUND OF THE INVENTION

(1) Field of the Invention

The present invention relates generally to expanded repair sleeves for the tubes of heat exchangers in a nuclear reactor or the like and, more particularly, to a repair sleeve having one or more teeth adapted to engage the interior surfaces of the tubes to provide a leak resistant seal.

(2) Description of the Prior Art

The tubes of heat exchangers such as oil coolers, steam generators, reheaters or feedwater heat exchangers, in particular those of power plants, are subjected to high mechanical and thermal stresses as well as the corrosive action of the fluid which passes therethrough. The severity of the environment causes degradation of the tubes resulting in cracks. The process of replacing tubes, particularly in power plants where down time must be limited, is both expensive and time consuming. Therefore, it is highly desirable to forestall replacement by repairing localized defects.

It is known to temporarily repair defective tubes by plugging them. However, plugging is only a temporary remedy as it reduces the overall heat transfer surface area of the heat exchanger, and thereby materially reduces its efficiency.

Further, it is known to repair a localized tube defect by installing an inner sleeve which spans the defect. The sleeve is inserted through the end of the tube and thereafter expanded near its ends to form a sealing engagement with the tube. Such expansion may be accomplished by mechanical rolling. Further, in order to secure the sleeve until it is roll expanded, it is known to expand the sleeve by means of a mandrel having an orifice for conducting high pressure fluid and a pair of O-rings flanking the orifice. The O-rings form a sealing engagement with the tube such that as fluid is forced into the space between, the wall of the sleeve is forced outwardly. In order for such mandrel designs to reach the desired expansion pressures, the geometry and surface finish of the sleeve must be tightly controlled. Also, when the expansion process is complete, fluid will leak out of the area between the seals and into the heat exchanger tube. This leakage of water could become a problem if the heat exchanger is, for example, radioactively contaminated. An example of an expander using seals is disclosed in U.S. Pat. No. 5,009,002 to Kelly.

To avoid the problems disclosed above, hydraulic expansion mandrels have been developed which provide one or two bladders for receiving the pressurized fluid. The bladders typically have geometries that are difficult to form. For example, U.S. Pat. No. 4,616,392 and U.S. Pat. No. 4,724,595, both issued to Snyder, disclose a bladder having a lip which engages a groove on the mandrel body for sealing purposes.

U.S. Pat. No. 4,724,693, issued to Tedder, discloses a mandrel wherein the end caps have grooves against which the bladder reacts when pressure is applied. In both cases, sophisticated machining must be performed to assure that the bladders will mate with the other parts of the expander.

U.S. Pat. No. 4,513,497, issued to Finch, discloses a tube expanding technique for securing a sleeve within a tube using a tube expanding device which has a distensible, sealed bladder. The technique utilizes a control system which operates to expand the bladder until the sleeve or tube yield point is detected. After this point, the system is either shut down or an additional volume of fluid is added to bring about a small tube outer diameter increase. It has been found that the technique disclosed does not accurately accommodate variations in the properties of the sleeve and/or the expansion mandrel. In particular, the detected yield point may depend upon the tube and sleeve dimensions and the number and length of the bladders on the expander. Finch recognizes this limitation of the apparatus and technique, stating simply that the use of more than one bladder would result in a decrease in the controllability of the expansion due to the sleeve and tube properties variance between the two points being expanded.

Hydraulic expansion also has been used to expand tubes either within or above and below tube sheets or tube support plates to restrain the motion of either the tube or the plate. Typically, a tube is expanded into the tube sheet to close the crevice between the tube and the tube sheet. Deposits accumulate within this crevice, creating the risk of tube damage from impurities in the deposits. To minimize the risk of crevice concerns, the tubes are pressurized and expanded until they contact the tube sheet bore. There is little risk of over expanding the tube since the tube sheet provides a very stiff backing to the tube.

A sleeve also may be used to repair a defective portion of a tube not at a tube sheet by expanding the sleeve into the tube to span the defect with a set of expansions on either side of the tube defect. The tube outer diameter expansion size is generally chosen based on qualification testing that takes into account heat exchanger operating conditions and acceptable leak rates as discussed in more detail below. To best control the expansion sizes, it is not possible to use pressure as a means of controlling the process due to potential variations in the yield strength and size of the tube and sleeve material. In the free-span portion of the tube, where it is not backed by the tube sheet material, the risk of over expanding the tube is great if the expansion process is not tightly controlled. If an overexpansion occurs, the tube may crack either during the expansion operation or during the operation of the heat exchanger due to high stresses in the expanded region.

The acceptable leak rate between the sleeve and tube is an issue within all designs of heat exchangers. However, in radioactively contaminated heat exchangers, the leakage from the contaminated side of the tube to the clean side will result in the contamination of otherwise clean system components. In heat exchangers with dissimilar fluids on each side of the tube, such as an oil cooler, where one side of the tube is filled with water and the other with oil, leakage will result in the mixing of one fluid with the other, a potentially unacceptable situation that may result in damage to other system components. Similarly, leakage from the primary side to the secondary side of a steam generator may result in extensive contamination and mechanical damage. Finally, in pre-heater or feedwater heat exchangers, the leakage of fluid from one side of the tube to the other will result in the loss of efficiency of the unit. Based on the type of heat exchanger to be sleeved, an acceptable leak rate for the sleeve can be determined. In cases where the flow rate through the heat exchanger is high and the risk of contamination or damage to the system components is low, a higher leak rate may be acceptable.

In order to properly locate a sleeve, it is important to accurately locate the center of the sleeve with respect to the defect in the tube. U.S. Pat. No. 4,159,564, issued to Cooper, Jr., discloses the use of an eddy current coil to detect the presence of the end of the tube sheet. Because the device disclosed uses the tube to return the eddy current signal to a monitoring device, there is a significant amount of electrical noise due to both stray currents within the tube and the electrical connection between the coil and the tube. With this high electrical noise, it is not possible to detect small tube defects. Moreover, in a typical heat exchanger, the inside of the tubes are typically coated with a layer of oxides or other deposits, creating a non-uniform electrical connection. The eddy current device described in the patent to Cooper, Jr., could only reliably be used where the tubes were cleaned prior to sleeving, a man-power intensive effort.

To applicant's knowledge, all previous hydraulically expanded sleeves, and in fact all repair sleeves, have consisted of simply a smooth outer surface for engagement with the interior surface of the tube to be repaired. These sleeves relied on the residual radial stress within the sleeve from the expansion process to minimize the leakage between the sleeve and the tube in the free-span region of the tube. Such smooth surfaced sleeves generally cannot be installed into a steam generator because such repairs result in unacceptably large leak rates between the sleeve and the tube, creating a significant safety concern.

Thus, there exists the need for a repair sleeve for use with a hydraulic sleeve expander for installation in the tubes of a heat exchanger which substantially reduces the leak rate between the installed sleeves and the tubes. Further, there exists a need for such a repair sleeve which is versatile and relatively inexpensive to manufacture while, at the same time, minimizes cracking and other damage to the parent tube.

SUMMARY OF THE INVENTION

The present invention is directed to a sleeve for installation in a parent tube by means of a sleeve expander of the type operable between an expanded state and an unexpanded state. The sleeve includes an elongated sleeve member having an outer wall and a bore sized and configured to receive the sleeve expander when the sleeve expander is in the unexpanded state. An engagement structure extends radially outward from the outer wall of the sleeve member for engagement with the interior surface of the parent tube.

In the preferred embodiment, the engagement structure includes a plurality of circumferential teeth located along the outer wall of the sleeve member and at both ends of the sleeve member which are inclined to each other with respect to each of the ends. Also, in the preferred embodiment, the engagement structure includes a plurality of peripheral lands formed on the outer wall of the sleeve member, wherein the plurality of teeth are disposed between at least two of the peripheral lands located at each end of the sleeve.

Also, in the preferred embodiment, the thickness of the sleeve member tapers in the direction of each of its end openings to facilitate insertion of the sleeve into the parent tube and to facilitate insertion of the expander and inspection equipment into the sleeve.

Accordingly, one aspect of the present invention is to provide a sleeve for installation in a parent tube by means of a sleeve expander of the type operable between an expanded state and an unexpanded state, the parent tube having an interior surface. The sleeve includes: (a) an elongated sleeve member having an outer wall and a bore sized and configured to receive the sleeve expander when the sleeve expander is in the unexpanded state; (b) an engagement structure extending radially outward from the outer wall of the sleeve member for engagement with the interior surface of the parent tube; and (c) wherein, when the sleeve member is expanded by the sleeve expander, the engagement structure engages the interior surface of the parent tube.

Another aspect of the present invention is to provide an engagement structure for facilitating an interference fit between an elongated sleeve member having an outer wall and a parent tube having an interior surface as the sleeve member is expanded radially into contact with the interior surface of the parent tube, the engagement structure including at least one engagement member extending radially from the outer wall of the sleeve member.

Still another aspect of the present invention is to provide a sleeve for installation in a parent tube by means of a sleeve expander of the type operable between an expanded state and an unexpanded state, the parent tube having an interior surface. The sleeve includes: (a) an elongated sleeve member having an outer wall and a bore sized and configured to receive the sleeve expander when the sleeve expander is in the unexpanded state; (b) an engagement structure extending radially outward from the outer wall of the sleeve member for engagement with the interior surface of the parent tube, wherein the engagement structure includes at least one tooth; and (c) an opening formed in an end thereof the sleeve member and communicating with the bore, the thickness of the sleeve member tapering in the direction of the opening; (d) wherein, when the sleeve member is expanded by the sleeve expander, the engagement structure engages the interior surface of the parent tube These and other aspects of the present invention will become apparent to those skilled in the art after a reading of the following description of the preferred embodiment when considered with the drawings.

BRIEF DESCRIPTION OF THE DRAWINGS

FIG. 3 is a cross-sectional schematic view of the repair sleeve installed within a tube as installed by an expander having multiple bladders;

FIG. 4 is a graphical representation of pressure within the expander as measured by the pressure transducer versus the displacement of the fluid applying piston as measured by the displacement transducer during the repair sleeve installation process;

DESCRIPTION OF THE PREFERRED EMBODIMENTS

Figure 1:
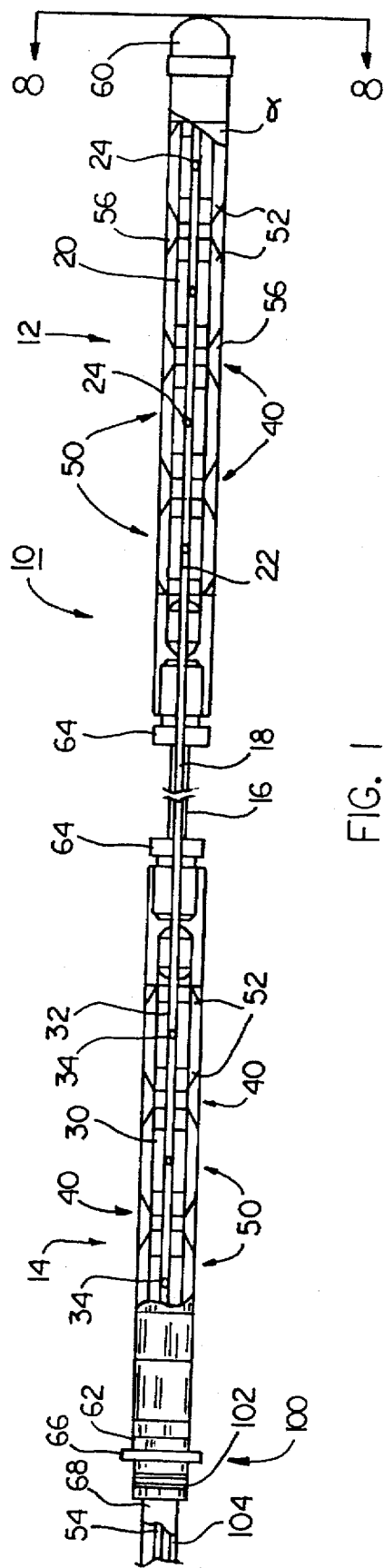
FIG. 1 is a side cross-sectional, fragmentary elevational view of a hydraulic sleeve expander for use with a repair sleeve constructed according to the present invention.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1 in particular, it will be understood that the illustrations are for the purpose of describing a preferred embodiment of the invention and are not intended to limit the invention thereto. As best seen in FIG. 1, a hydraulic sleeve expander, generally designated 10, for installing repair sleeves 200 according to the present invention is shown.

Expander 10 is designed to install a sleeve 200 in a tube 202 such that the sleeve is secured in the tube at expansion zones 204, as shown in FIG. 3. Sleeve 200 is preferably constructed of a material which is less susceptible to the attack mechanism acting on tube 202. Sleeve 200 may also be coated with a very hard material to improve its erosion resistance in the event that water or steam cutting is damaging the tube. Moreover, the sleeve material is preferably chosen such that the sleeve has a greater thermal expansion coefficient than the material of the parent tube. Sleeve 200 is discussed in greater detail below.

Turning now to expander 10 in more detail, expander 10 includes upper assembly 12 and lower assembly 14 joined by flexible connector tube 16. Upper assembly 12 and lower assembly 14 include first stud 20 and second stud 30, respectively. First stud 20 and second stud 30 are secured to opposite ends of connector tube 16 by intermediate caps 64. About each stud are positioned one or more resilient, high strength, plastic bladders 50 and mid-span spacers 40 separating respective bladders.

Bladders 50 and spacers 40 are slidably mounted on the studs without sealing thereto such that they float and are held thereon by intermediate caps 64, base cap 62, and terminal cap 60. Preferably, two or more bladders 50 are provided on each stud. Hard stop 66 is secured to base cap 62 and serves to locate the end of the repair sleeve. Sheath 68 extends from hard stop 66 and protects high pressure tube 54 and leads 104 (as discussed below) as well as providing means for maneuvering expander 10.

Studs 20, 30 are provided with axially extending fluid conduits 22, 32 and connector tube 16 is provided with axially extending conduit 18, thereby providing fluid communication from high pressure tube 54 to terminal cap 60. Radially extending conduits 24, 34 provide fluid communication between conduits 22, 32 and bladders 50. Bladders 50 have tapered ends 52 which are complementary to annular tapered ends 56.

Expander 10 is connected to hydraulic control system 70 for fluid communication therewith by high pressure tubing 54, thereby forming a hydraulic expansion system. Control system 70 includes control computer 80 which is electrically connected to displacement transducer 72, fluid supply piston 76, and pressure transducer 74. The latter three components are preferably housed in box 71. Control computer 80 is operative to receive and interpret electrical signals generated by transducers 72, 74 and is further operative to actuate in each direction and deactuate piston 76.

Figure 2:
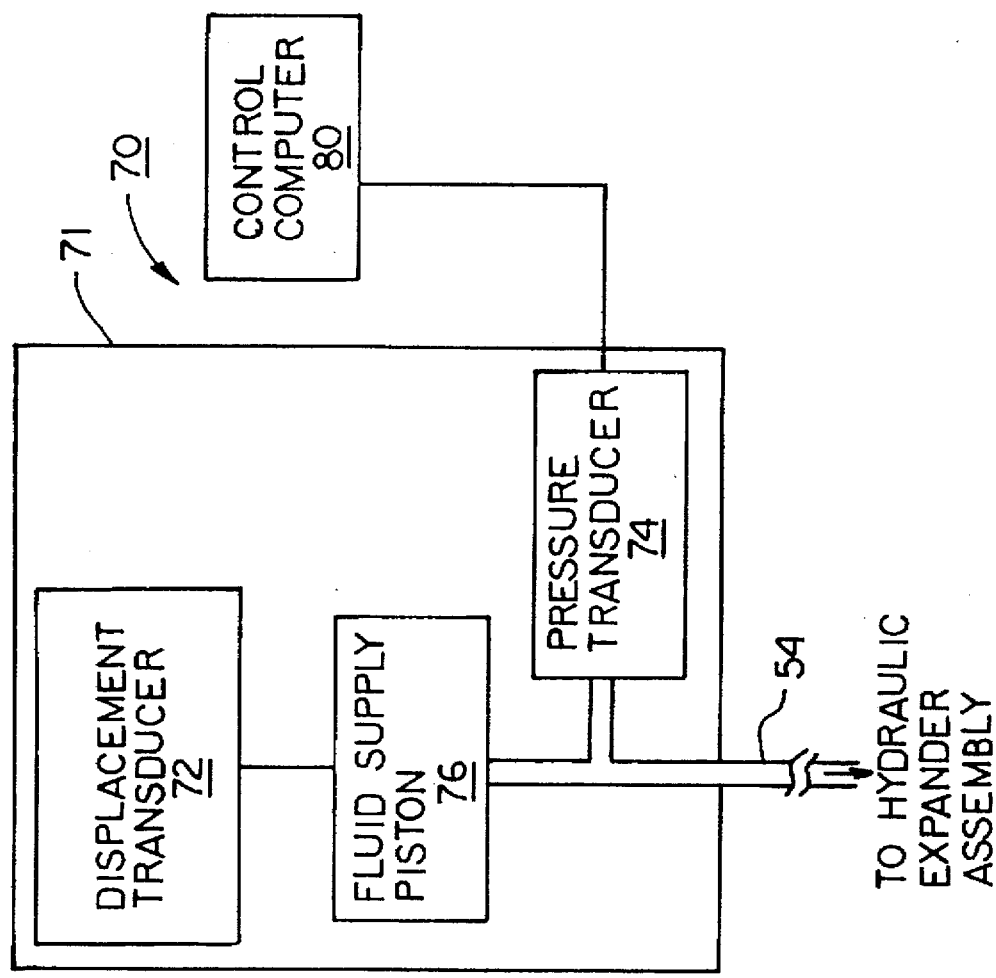
FIG. 2 is a schematic diagram of the detecting and control systems of the hydraulic sleeve expander system shown in FIG. 1.
Figure 2:
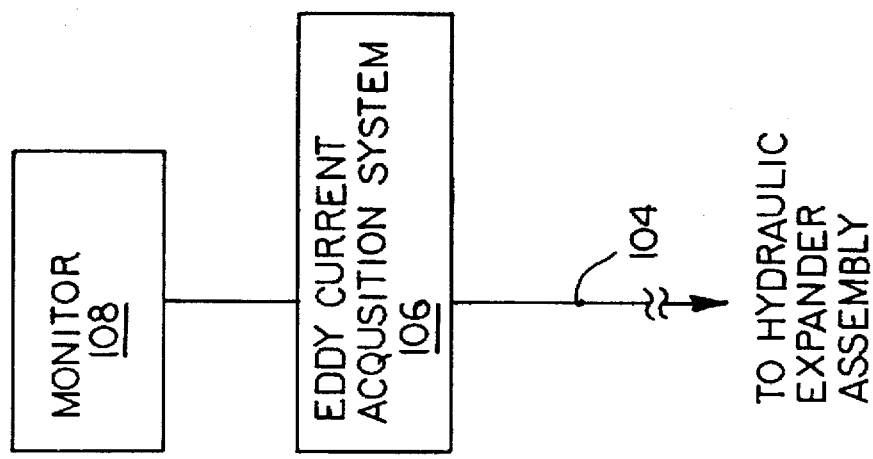

Eddy current detector 100, preferably a bobbin probe, is provided at the trailing end of expander 10. Detector 100 includes coils 102 which electrically communicate with eddy current acquisition system 106 as shown in FIG. 2 via leads 104, preferably coaxial cable. Eddy current acquisition system 106 is preferably connected to a display monitor 108.

In general, fluid supply piston 76 pressurizes or depressurizes the fluid in tube 54. Piston 76 is controlled by control computer 80, preferably including a display monitor, which is responsive to input received from displacement transducer 72 and pressure transducer 74. Pressure transducer 74 measures the pressure in tube 54, which corresponds to the pressure in bladders 50. Displacement transducer 72 measures the displacement of piston 76 which corresponds to the volume of fluid added to the system.

When the system is pressurized, bladders 50 fill with fluid, causing them to swell and radially expand. Bladders 50 expand by plastic deformation such that tapered ends 52 maintain an interference fit with tapered ends 56. The tapered ends of the bladders in conjunction with tapered ends 56 serve to maintain a sufficient seal for the high pressure operation as well as to smooth the expansion transition. As bladders 50 swell, they contact the inner diameter of sleeve 200, creating an expansion of the sleeve. This process continues until the sleeve contacts tube 202. At this point, the sleeve and tube expand together until the required volume of fluid is added to the system. The system is depressurized by withdrawing piston 76. When the system is depressurized, the bladders 50 return to their original shape so that expander 10 can be easily removed from sleeve 200 after expansion.

Eddy current detector 100 is constructed such that it creates an electromagnetic field in the tube when in operation. Preferably, detector 100 consists of coil 102 of copper wire wound circumferentially around a plastic insert. As expander 10 is passed through tube 202, eddy current acquisition system 106 monitors the electrical signal returning from detector 100. When the coil passes over either a tube defect or passes near a tube support plate, the signal on the acquisition system screen changes, alerting the operator of the presence of either a defect or support plate. By the orientation of the signal on the data screen, the operator will know the type and size of the defect that the coil has just passed over.

Expander 10 allows for a substantial amount of versatility in applications. By increasing the number of bladders 50 and thereby the number of expanded areas on each end of the sleeve, the leak rate between the tube and the sleeve can be reduced because the fluid has a more torturous leak path. However, as the number of bladders increases, the overall length of the sleeve also increases. The expander of the present invention may be modified for any number of bladders, merely by changing the lengths of the studs, the number of bladders, and the number of mid-span spacers. Thus, the operator many adapt the expander to his specific needs, giving suitable relative weights to the number of expansion zones 204 needed and the overall sleeve length allowed.

In order to expand the sleeve on either side of a defect, the expander connector can be made as long as necessary depending on the length of the sleeve to be installed. The length of the sleeve desired is determined by the position of the defect within the tube. The expander connector may be easily replaced during expander use. Further, the flexibility of the connector tube eases removal of the expander from the tube after the sleeve has been installed. It also will be appreciated that because bladders are used, the inside sleeve geometry does not need to be controlled as tightly during sleeve fabrication and the fluid used in the expansion process is not leaked into the tube.

Sleeves may be installed in tubes using the apparatus as described above using the method according to the present invention as follows. The process of the present invention is particularly well-suited for repairing tube defects when expansion zones must be positioned away from a tube support plate. The expansion process is controlled by the point at which the sleeve contacts the tube. Past this point, an additional volume of fluid is added to the system, regardless of the tube response, to achieve the proper expansion size. The acceptable range of tube outer diameter expansions will vary for each application of the sleeve, depending on sleeve geometry and the heat exchanger operating conditions.

Preferably, the volume of fluid which must be added to the system after the sleeve has contacted the tube in order to achieve the proper expansion is determined during the qualification of the heat exchanger sleeve. This value will be different for each sleeve design, depending on the number and length of the bladders on the expander and the tube and sleeve dimensions.

During the expansion process, the point at which the sleeve contacts the tube is the first important process control point and is shown as "A" in FIG. 4. A pre-set value for the change in slope is input into control computer 80 such that when this point is reached, control computer 80 automatically registers contact. From this point on the process is purely piston displacement controlled, and a pre-set additional volume of fluid or piston displacement is injected into expander 10. When this volume of fluid is completely placed into expander 10, point "B" on FIG. 4, the system is depressurized and the expander removed from the sleeve and tube.

The following process for installing a sleeve using the hydraulic expander system of the present invention is preferred. First, expander 10 is assembled as desired for the particular application, selecting the appropriate connector tube length and number of bladders and spacers. Sleeve 200 is then installed on expander 10, positioning one end of sleeve 200 against hard stop 66. Fluid supply piston 76 is then actuated to pressurize bladders 50 such that they radially expand into contact with the inner diameter of the sleeve. Bladders 50 are expanded such that they form an interference fit with sleeve 200 strong enough to hold the sleeve in place during insertion into the tube, but without deforming the sleeve. Expander 10 and sleeve 200 mounted thereon are inserted into heat exchanger tube 202 using expansion sheath 68. As expander 10 and sleeve 200 are inserted into the tube, eddy current detector 100 provides input to acquisition system 106 which system 106 in turn interprets and outputs to display monitor 108. The operator observes monitor 108 to locate the defect. Once the defect has been located, the operator pulls back on expansion sheath 68 a pre-set distance to center the sleeve over the defect.

Control computer 80 then begins the expansion process by actuating fluid supply piston 76 to force fluid into expander 10. Meanwhile, control computer 80 monitors and records the pressure of the system and the piston displacement. Preferably, control computer 80 displays the expansion process on the monitor. As the pressure increases, the change in the slope of the pressure verses displacement data is monitored (see FIG. 4). When sleeve 200 has contacted tube 202, the slope will begin to increase rapidly. The pressure at which this will occur varies with the tube and sleeve dimensions and yield strength. Once the sleeve has contacted the tube, control computer 80 actuates fluid supply piston 76 to force an additional, prescribed amount of fluid into the system. This amount is based on the qualification results and will differ for varying sleeve, tube, and expander properties. After proper piston displacement is reached, the system is depressurized and essential data may be stored to computer disk. The expander is then removed from the sleeve and tube, and the process may be repeated.

In the repair of a parent tube using a repair sleeve, there are at least two significant concerns. First, it is necessary to insure that the repair sleeve will remain in position over the tube defect or tube support plate and will not be displaced by the fluid flowing there through. Second, it is desirable to minimize the migration of fluid between the repair sleeve and the covered portion of the parent tube where it may subsequently migrate through a defect in the parent tube. Hence, it is desirable to form secure and fluid tight joints between the sleeve and the parent tube on either side of the defect in the tube or a tube support place.

With reference to FIGS. 5–9, a preferred sleeve 200 is shown in more detail therein. The sleeve according to the present invention includes a machined pattern on its outer surface which, when combined with the residual radial stress of the sleeve from the expansion process, significantly limits the leakage between the tube and the sleeve. The machined pattern further serves to create stronger joints between the sleeve and the tube to minimize relative slippage. Repair sleeves according to this improved design are particularly well suited for expansion repairs performed outside of the tube sheet and in the free-span portion of the parent tube.

Figure 5:
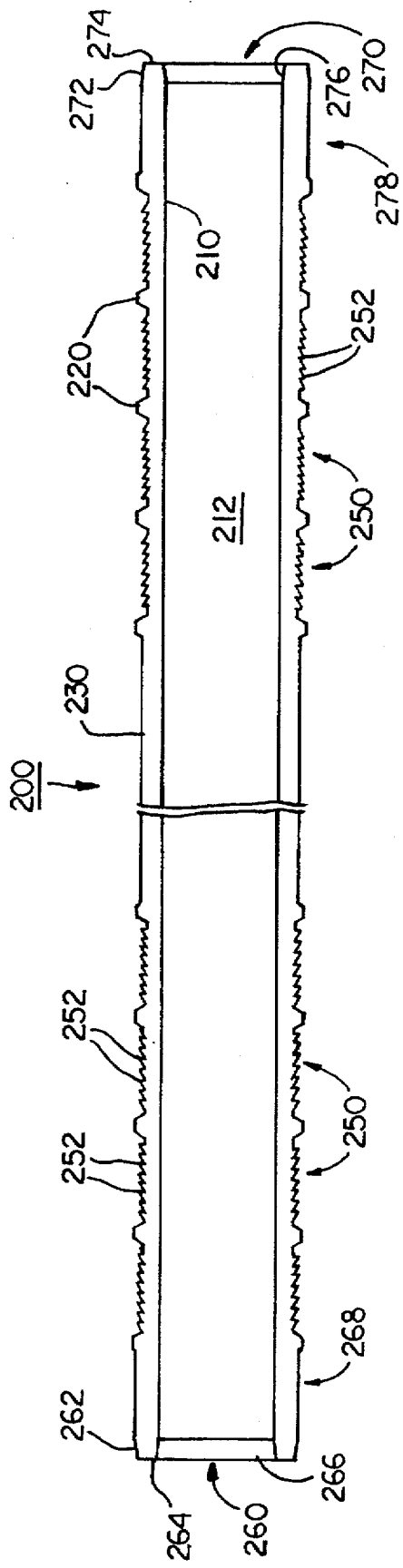
FIG. 5 is an enlarged side cross-sectional view of the repair sleeve shown in FIG. 3.
Figure 6:
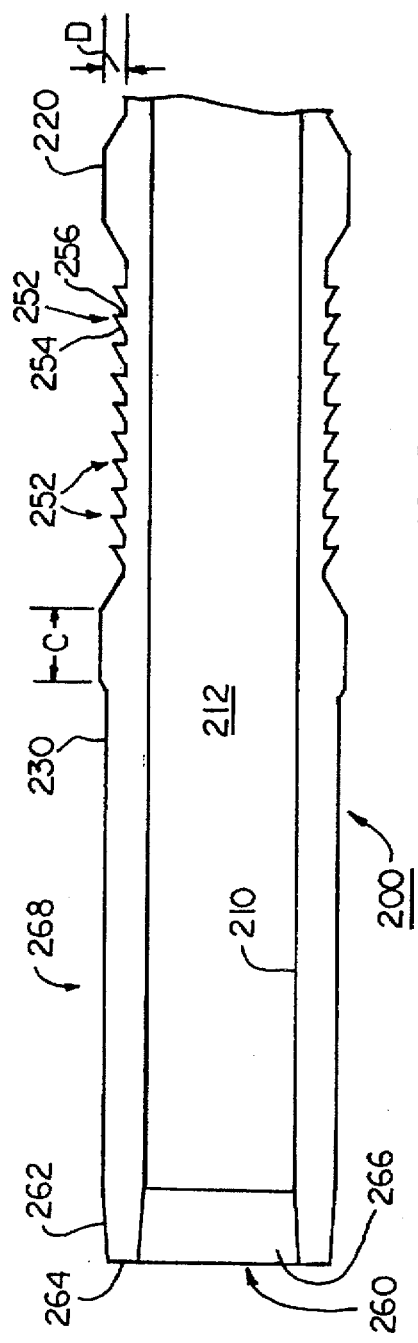
FIG. 6 is a greatly enlarged, fragmentary cross-sectional view of the repair sleeve shown in FIG. 5.
Figure 9:
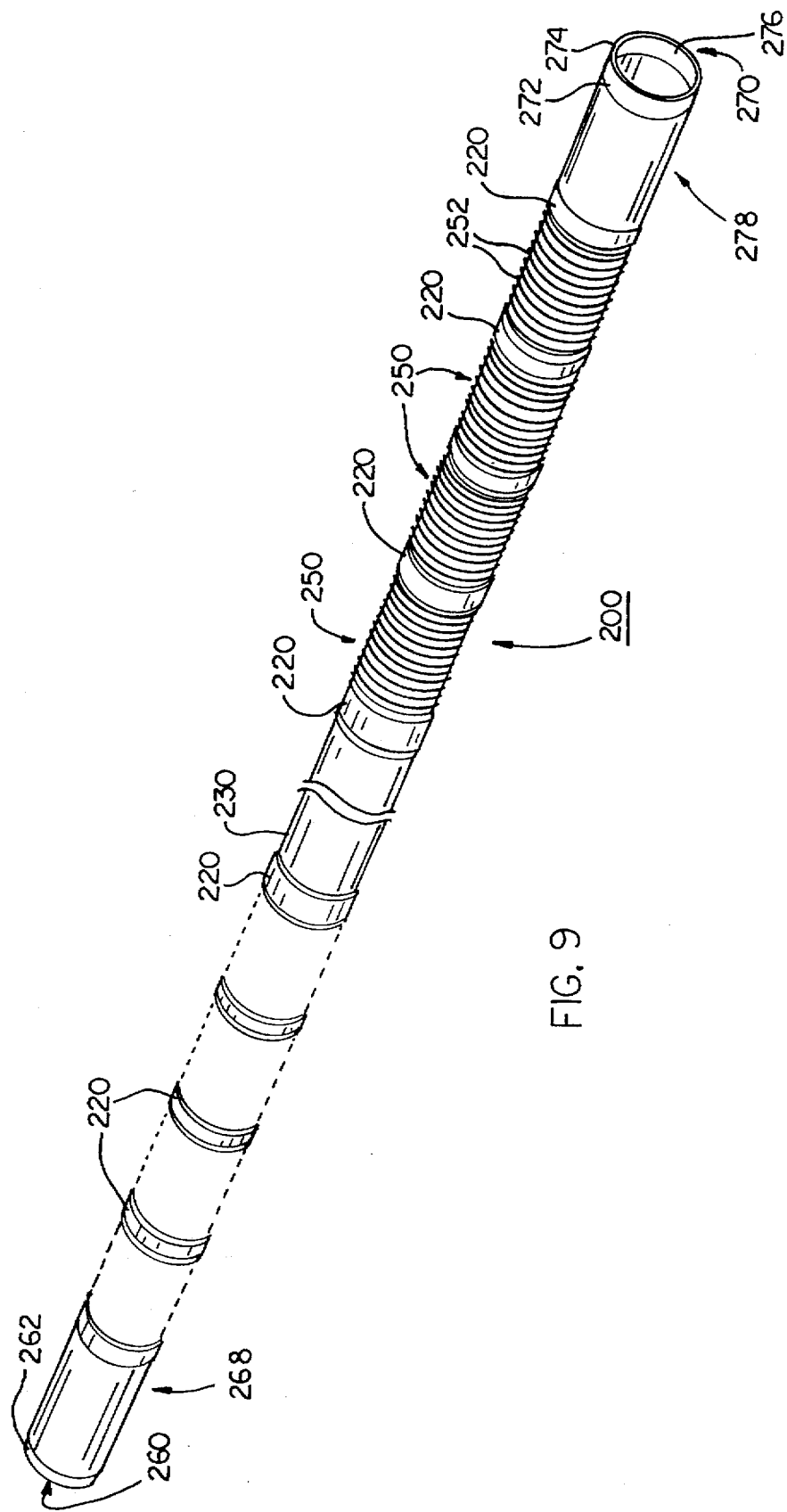
FIG. 9 is a perspective view of the repair sleeve.

With particular reference to FIGS. 5 and 6, sleeve 200 includes outer wall 230 and bore wall 210. Bore wall 210 defines longitudinally extending bore 212. Inlet end 268 includes inlet opening 260. Similarly, exit end 278 includes exit opening 270. Each of inlet opening 260 and exit opening 270 communicate with bore 212, thereby providing a continuous flow path for fluid through sleeve 200.

Sleeve 200 includes a plurality of engagement sections 250, each separated from respective engagement sections 250 by lands 220. Expansion sections 250 correspond in location to expansion zones 204 as discussed previously. Each of the expansion sections 250 includes a plurality of teeth or, preferably, ribs 252 extending outwardly from outer wall 230 of sleeve 200. More preferably, ribs 252 extend around the circumference of tubular outer wall 230 in parallel relation as shown.

Figure 7:
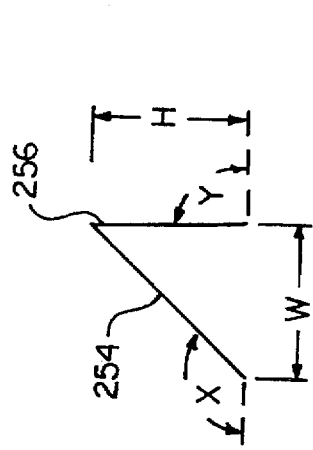
FIG. 7 is a fragmentary, schematic view of an individual rib forming a part of the repair sleeve shown in FIG. 6.

As best seen in FIGS. 6 and 7, ribs 252 each include first wall 254 and second wall 256. Each second wall 256 faces toward the middle of sleeve 200 while each first wall 254 faces the nearer of the inlet end 268 and the exit end 278. Each rib 252 preferably has a width W in the range of between about 0.005 to 0.030 inches, and a height H in the range of between about 0.005 to 0.030 inches. In the preferred embodiment, the angle X between outer wall 230 and first wall 254 is greater than the angle Y between second wall 256 and outer wall 230. More preferably, angle X is in the range of between about 110 to 150 degrees and angle Y is in the range of between about 80 to 120 degrees. The distance between the peaks of adjacent, parallel ribs is between about 0.020 and 0.120 inches.

Lands 220 preferably have a width C in the range of about 0.500 inches between adjacent sets of ribs. Further, lands 220 have a height D the same as or slightly greater than height H of ribs 252.

Protective lands 220 between engagement sections 250 serve to protect ribs 252 during insertion of sleeve 200 into parent tube 202. However, it is preferable that the overall length of the engagement sections 250 be maximized to accommodate misposition of bladders 50 with respect to sleeve 200 during hydraulic expansion of the sleeve.

Figure 8:
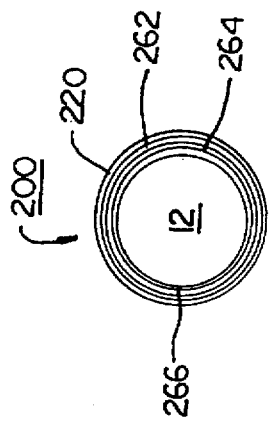
FIG. 8 is an end view of the repair sleeve shown in FIG. 1, taken along lines 8—8.

As best seen in FIGS. 6 and 8, inlet end 268 includes tapered outer wall 262, tapered bore wall 266, and end wall 264 adjacent to inlet opening 260. The structure of exit end 278 is the mirror image of inlet end 268. Exit end 278 includes tapered outer wall 272, end wall 274, and tapered bore wall 276 corresponding to elements 262, 266, and 264, respectively. Tapered outer walls 262, 272 are preferably tapered at an angle of between 2 to 45 degrees with respect to the longitudinal axis of the sleeve. Tapered bore walls 266, 276 are preferably tapered at an angle of between about 2 to 45 degrees with respect to the longitudinal axis of the sleeve.

Tapered outer walls 262, 272 facilitate insertion of sleeve 200 into the parent tube. Tapered bore walls 266,276 facilitate insertion of expander 10 and other tools such as inspection equipment into sleeve 200. Because these operations are typically executed remotely, the provision of the various tapered walls is of great benefit.

Preferably, sleeve 200 is axially symmetric so that either end may be used as the inlet or exit end.

Sleeve 200 may be formed from any suitable method for machining metal. Such method may consist of a single machining step in shop conditions. Preferably, as noted above, the sleeve material is chosen such that the sleeve has a greater thermal expansion coefficient than the material of the parent tube such that, during plant operation, the thermal expansion differences cause the ribs to expand into or against the tube. Suitable sleeve materials may include stainless steel and nickel, bronze and copper alloys.

As sleeve 200 is expanded by expander 10 in the regions of engagement sections 250, ribs 252 bite into parent tube 202, creating a tortuous path for leakage between the sleeve and the parent tube. Because of the relative arrangement and configuration of first walls 254 and second walls 256, the loads generated between sleeve 200 and tube 202 during installation pre-load ribs 252. In particular, as sleeve 200 is expanded, there is a tendency for the sleeve to shorten axially. Because the ribs are already in contact with the interior surface of the parent tube as a result of radial expansion, the aforementioned shortening creates an additional build-up of axial loads between the ribs and the parent tube. The above-described rib geometry serves to minimize deflection of the ribs due to the axial loading.

Generally, pre-loading as described above will significantly reduce the leakage rate between the tube and the ribs of the sleeve. Under operating conditions, there is a tendency for the sleeve to grow lengthwise. This causes the ribs to axially pull away from the interior surface of the tube somewhat. Because the ribs are axially pre-loaded, the reduction in axial loading due to the lengthwise expansion will merely cause a reduction in the loading between the sleeve and the tube, and an adequate joint therebetween is maintained.

Applicant's testing has shown that the aforementioned pre-loading is not overcome during steam generator operating or simulated accident conditions. Further, it has been found that the preferred profile as shown in the figures, which consists of equally spaced ribs 252 each having their respective second wall 256 facing toward the center of the sleeve, results in minimized overall leakage while maintaining the appropriate joint strength between respective ribs 252 and the interior wall of the parent tube at the expansion zones.

Ribs 252 on outer wall 230 of sleeve 200 also serve to offset the effect of sleeve "spring back" after the expansion process is complete. In the case of a smooth, conventional sleeve, when the sleeve springs back or contracts following the subsidence of the expander, a leak path is formed between the sleeve and the tube. However, ribs 252 of sleeve 200 are able to deflect (i.e., elastically deform) adequately to account for the spring back of sleeve 200 such that when the expansive force is removed, ribs 252 maintain contact with the interior surface of the parent tube by resiliently returning as needed to the extended position.

During typical sleeve installation, stress relief may be performed to lower the residual stresses in the parent tube in order to minimize tube cracking. Because the mechanical sleeve results in smaller expansion sizes than for other types of joints, the need for stress relief is reduced or eliminated. However, ribs 252 are also designed such that they may be stress relieved in conventional fashion after sleeve 200 is installed within the parent tube. It has been found that stress relieving by heating the sleeve and tube will not compromise the securement therebetween.

The effect of ribs 252 "biting" into tube 202 does not tend to create tube cracking at the rib/interior surface interface, because the stresses are compressive in nature. Therefore, the ribs do not adversely affect the integrity of the tubing.

It will be appreciated that sleeves 200 as described above may be used to repair tubes in steam generators as well as non-steam generator heat exchangers. In the case of heat exchangers, the ribs create a tortuous leak path for the tube side water attempting to migrate to the shell side. Moreover, the disclosed sleeve design may be used anywhere minimal leakage is required or desired when sleeving a defective tube.

It will be further appreciated that, although a particular rib geometry has been presented, various proportions, shapes, sizes, and numbers of ribs may be used in each expansion zone. The preferred configuration will depend upon the particular application of the sleeve. For example, for applications located near the tube sheet, ribs are necessary only on the end portion of the tube extending outside the tube sheet.

Prior to any welding technique, the tube surface must be thoroughly cleaned. No cleaning of the tube is required prior to installation of the sleeve according to the present invention. As a result, significant savings of on-site installation time and expense may be realized. Further, in a nuclear heat exchanger environment, there is a reduced risk of radioactive contamination from the interior surface of the tube. The contaminated waste from hones, hone dust, and filters is eliminated.

Certain modifications and improvements will occur to those skilled in the art upon a reading of the foregoing description. By way of example, as an alternative to ribs 252 or the like, an alternate material may be provided on outer wall 230 prior to expansion into the parent tube. The alternate material could be a resilient gasket material or sealant such as metal and carbon foils and high temperature elastomer materials which would block leakage from occurring after the sleeve is installed. It should be understood that all such modifications and improvements have been deleted herein for the sake of conciseness and readability but are properly within the scope of the following claims.

We claim:

1. A sleeve engagement surface for facilitating an interference fit between an elongated sleeve member having an outer wall and a parent tube having an interior surface, said engagement surface comprising a plurality of spaced apart expansion sections located along the length of said sleeve member, each of said expansion sections having at least one engagement member extending radially from the outer wall of the sleeve member, wherein said engagement member includes a plurality of teeth; and further including a plurality of raised peripheral lands formed on said outer wall and disposed between each of said expansion sections.

2. The engagement surface of claim 1 wherein each of said teeth comprises a rib formed about said outer wall.

3. The engagement surface of claim 1 wherein said rib comprises at least a first wall extending radially outward from said outer wall and a second wall extending radially outward from said outer wall.

4. The engagement surface of claim 3 wherein said first wall and said second wall converge at an edge distal from said outer wall.

5. The engagement surface of claim 4 wherein said first wall is disposed at a first angle with respect to said outer wall and said second wall is disposed at a second angle with respect to said outer wall, and wherein said first angle is greater than said second angle.

6. The engagement surface of claim 5 wherein said sleeve tube includes an inlet end and an exit end, and wherein said first wall is nearer said inlet end than said second wall.

7. The engagement surface of claim 5 wherein said first angle is in the range of between about 110 to 150 degrees and said second angle is in the range of between about 80 to 120 degrees.

8. The engagement surface of claim 3 wherein said first wall is disposed at a first angle with respect to said outer wall and said second wall is disposed at a second angle with respect to said outer wall, and wherein said first angle is greater than said second angle.

9. The engagement surface of claim 8 wherein said sleeve tube includes an inlet end and an exit end, and wherein said first wall is nearer said inlet end than said second wall.

10. The engagement surface of claim 8 wherein said first angle is in the range of between about 110 to 150 degrees and said second angle is in the range of between about 80 to 120 degrees.

11. The engagement surface of claim 1 wherein said teeth are disposed parallel with respect to one another.

12. The engagement surface of claim 1 wherein said outer edge of said engagement surface is between about 0.005 to 0.030 inches greater than the diameter of said sleeve member.

13. The engagement surface of claim 1 wherein said plurality of circumferential teeth located along said outer wall of said sleeve member and at both ends of said sleeve member are inclined to each other with respect to each of said ends.

14. A sleeve for installation in a parent tube by means of a sleeve expander of the type operable between an expanded state and an unexpanded state, the parent tube having an interior surface, said sleeve comprising:

(a) an elongated sleeve member having a plurality of spaced apart expansion sections located along the length of said sleeve member, an outer wall and a bore sized and configured to receive the sleeve expander when the sleeve expander is in the unexpanded state;

(b) an engagement structure extending radially outward from each of said expansion sections of said sleeve member for engagement with said interior surface of said parent tube, wherein said engagement structure includes a plurality of teeth;

(c) a plurality of raised peripheral lands formed on said outer wall and disposed between each of said expansion sections;

(d) an opening formed in an end thereof said sleeve member and communicating with said bore, the thickness of said sleeve member tapering in the direction of said opening; and (e) wherein, when each of said expansion sections is expanded by the sleeve expander, said engagement structure of each of said expansion sections engages the interior surface of the parent tube.

15. The sleeve of claim 14 wherein a portion of said outer wall adjacent said opening slopes inwardly in the direction of said opening.

16. The sleeve of claim 14 wherein a portion of said bore adjacent said opening slopes outwardly in the direction of said opening.

17. The sleeve of claim 14 wherein a portion of said outer wall adjacent said opening slopes inwardly in the direction of said opening, and wherein a portion of said bore adjacent said opening slopes outwardly in the direction of said opening.

18. The sleeve of claim 14 wherein said sleeve member includes an inlet end and an inlet opening formed therein and communicating with said bore, the thickness of said sleeve member tapering in the direction of said inlet opening.

19. The sleeve of claim 14 wherein said sleeve member includes an exit end and an exit opening formed therein and communicating with said bore, the thickness of said sleeve member tapering in the direction of said exit opening.

20. The sleeve of claim 14 wherein said sleeve member includes an inlet end and an inlet opening formed therein and communicating with said bore, the thickness of said sleeve member tapering in the direction of said inlet opening, and wherein said sleeve member further includes an exit end and an exit opening formed therein and communicating with said bore, the thickness of said sleeve member tapering in the direction of said exit opening.

21. The sleeve of claim 14 wherein each of said teeth comprises a rib formed about said outer wall.

22. The sleeve of claim 21 wherein said rib comprises at least a first wall extending radially outward from said outer wall and a second wall extending radially outward from said outer wall.

23. The sleeve of claim 22 wherein said first wall and said second wall converge at an edge distal from said outer wall.

24. The sleeve of claim 23 wherein said first wall is disposed at a first angle with respect to said outer wall and said second wall is disposed at a second angle with respect to said outer wall, and wherein said first angle is greater than said second angle.

25. The sleeve of claim 24 wherein said sleeve tube includes an inlet end and an exit end, and wherein said first wall is nearer said inlet end than said second wall.

26. The sleeve of claim 24 wherein said first angle is in the range of between about 110 to 150 degrees and said second angle is in the range of between about 80 to 120 degrees.

27. The sleeve of claim 22 wherein said first wall is disposed at a first angle with respect to said outer wall and said second wall is disposed at a second angle with respect to said outer wall, and wherein said first angle is greater than said second angle.

28. The sleeve of claim 27 wherein said sleeve tube includes an inlet end and an exit end, and wherein said first wall is nearer said inlet end than said second wall.

29. The sleeve of claim 27 wherein said first angle is in the range of between about 110 to 150 degrees and said second angle is in the range of between about 80 to 120 degrees.

30. The sleeve of claim 14 wherein said teeth are disposed parallel with respect to one another.

31. The sleeve of claim 28 wherein said the outer edge of said engagement structure is between about 0.005 to 0.030 inches greater than the diameter of said sleeve member.

* * * * *